Aug. 7, 1928.

A. M. JOHNSON 1,679,531

GANG MACHINE TOOL

Filed Dec. 12, 1925

Inventor:
Albert M. Johnson,
By Chindahl, Parker & Carlson
Attys.

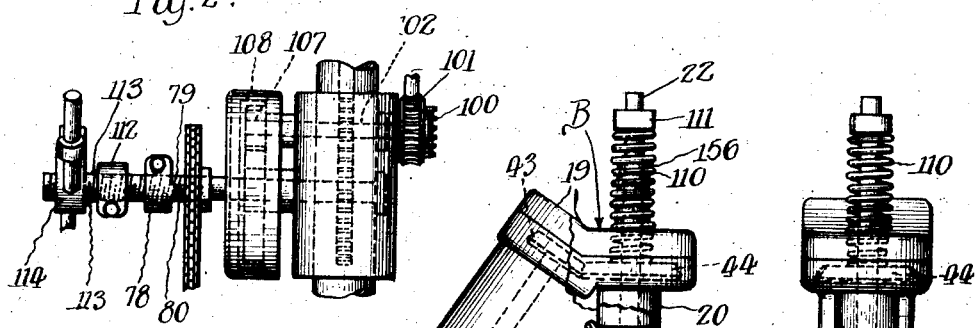

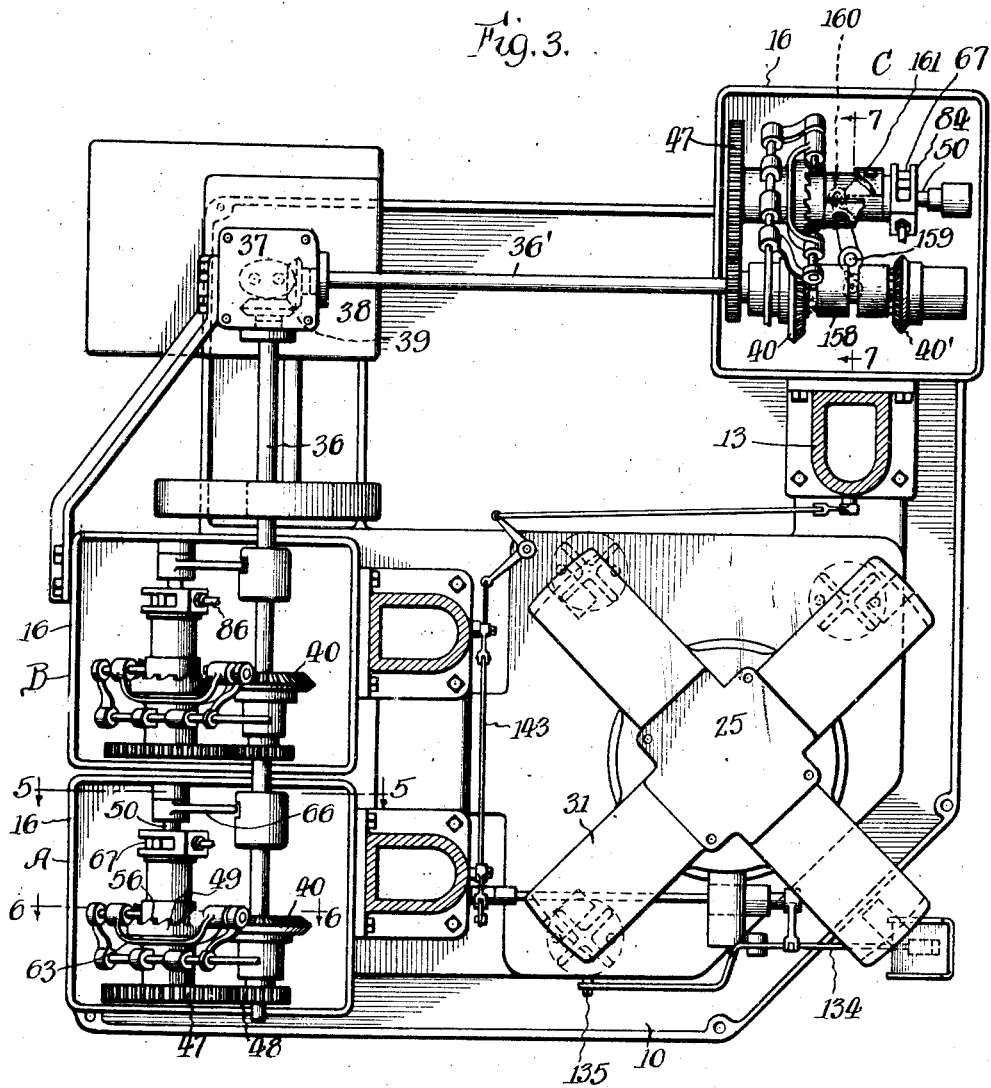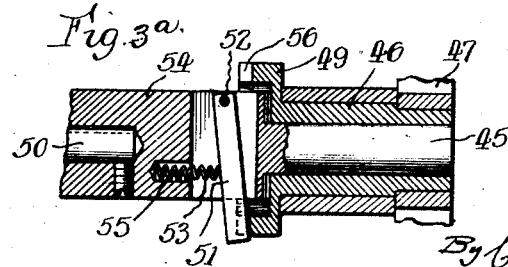

Aug. 7, 1928.
A. M. JOHNSON
1,679,531
GANG MACHINE TOOL
Filed Dec. 12, 1925    4 Sheets-Sheet 4
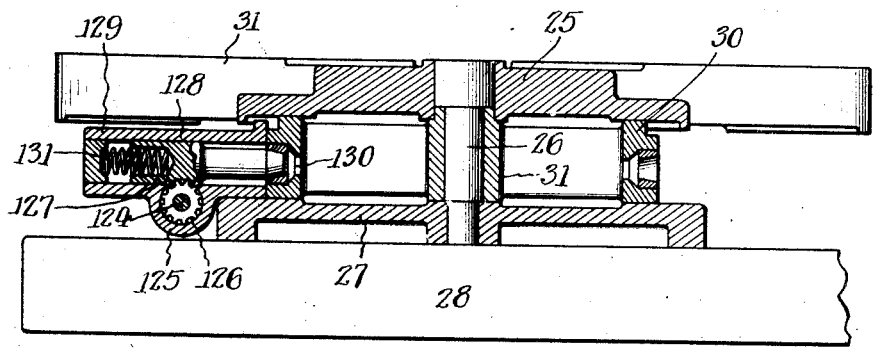
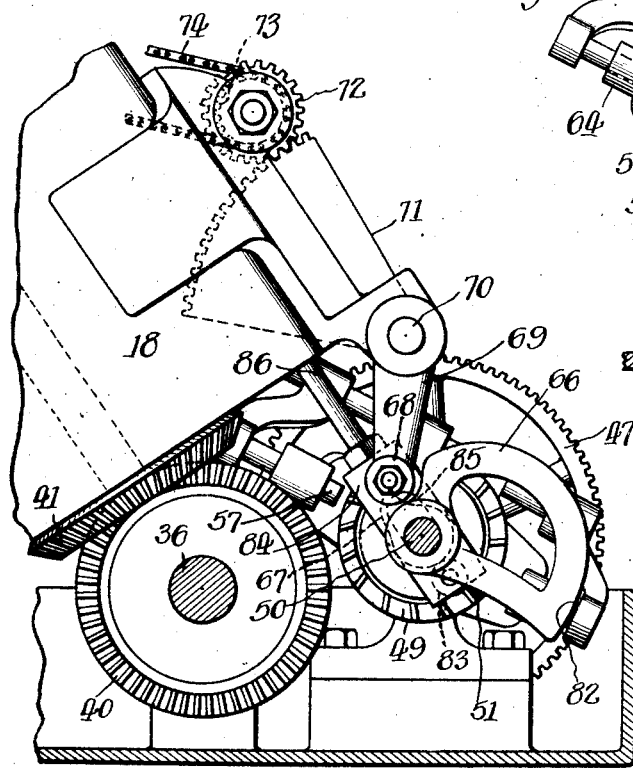
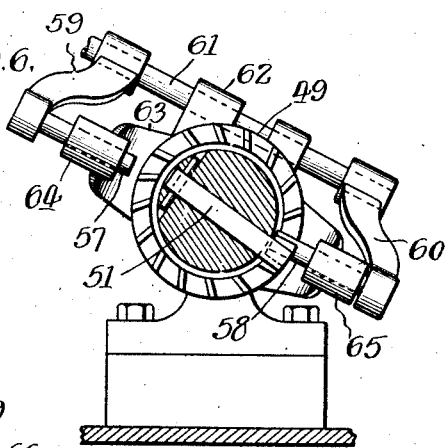
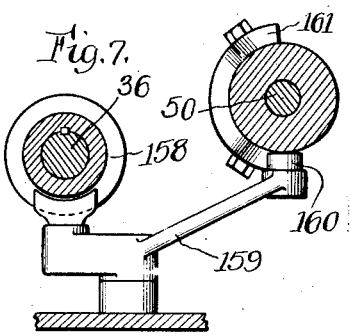
Inventor:
Albert M. Johnson,
By Tindale, Parker & Carlson
Attys.

Patented Aug. 7, 1928.

1,679,531

UNITED STATES PATENT OFFICE.

ALBERT M. JOHNSON, OF ROCKFORD, ILLINOIS, ASSIGNOR TO BARNES DRILL COMPANY, OF ROCKFORD, ILLINOIS, A CORPORATION OF ILLINOIS.

GANG MACHINE TOOL.

Application filed December 12, 1925. Serial No. 74,971.

The invention relates to a machine tool adapted to perform simultaneously a plurality of operations such, for example, as drilling, reaming, and tapping operations.

The object of the invention generally stated is to provide such a machine which is capable of reducing to a minimum not only the idle time of the machine, but the time of the operator for controlling the same.

Another object is to provide a machine of the gang type in which all of the several operating tools are in full view of the operator stationed at the front of the machine and all capable of independent control so that he may quickly stop the operation of any one of the tools when necessary.

A further object is to provide a machine tool of the gang type having a plurality of independent units with tool spindles equidistantly spaced so as to operate simultaneously upon the work mounted in similarly spaced relation on a rotary support or table and having means in combination with the table and common to the feed mechanisms of the several units for controlling the same.

Another object is to provide a gang tool in which the tool spindles are started on their downward strokes under the control of the work indexing mechanism, and are automatically restored to their initial positions upon the completion of their several operations.

The objects of the invention thus generally stated, together with other and ancillary advantages are attained by the construction and arrangement illustrated in the accompanying drawings forming part hereof, but it should be understood that it is contemplated that various changes in the construction and arrangement employed may be made by those skilled in the art without departing from the spirit and scope of the invention as expressed in the appended claims.

Figure 1 of the drawings is an elevational view of a machine embodying my invention.

Fig. 1ᵃ is a fragmentary detail view of a portion of the control mechanism.

Fig. 2 is a fragmentary elevational view looking in a direction substantially at right angles to that of Fig. 1, the upper end of the drilling unit being broken away to show the upper end of the reaming unit.

Fig. 2ᵃ is a fragmentary front view of a portion of the feed control mechanism employed for each unit.

Fig. 2ᵇ is a fragmentary side elevation of a portion of the feed mechanism.

Fig. 3 is a horizontal plan section taken approximately in the plane of line 3—3 of Fig. 2.

Fig. 3ᵃ is a fragmentary longitudinal section of a portion of the control mechanism.

Fig. 4 is a fragmentary vertical sectional view of the work table and indexing mechanism.

Fig. 5 is a fragmentary vertical sectional view of the control mechanism for the spindle feed employed in the case of two of the units of the machine, the view being taken approximately in the plane of line 5—5 of Fig. 3.

Fig. 6 is a similar view taken approximately in the plane of line 6—6 of Fig. 3.

Fig. 7 is a vertical sectional view taken approximately in the plane of line 7—7 of Fig. 3 and illustrating a portion of the control mechanism for another one of the units.

Figures 1, 1A:
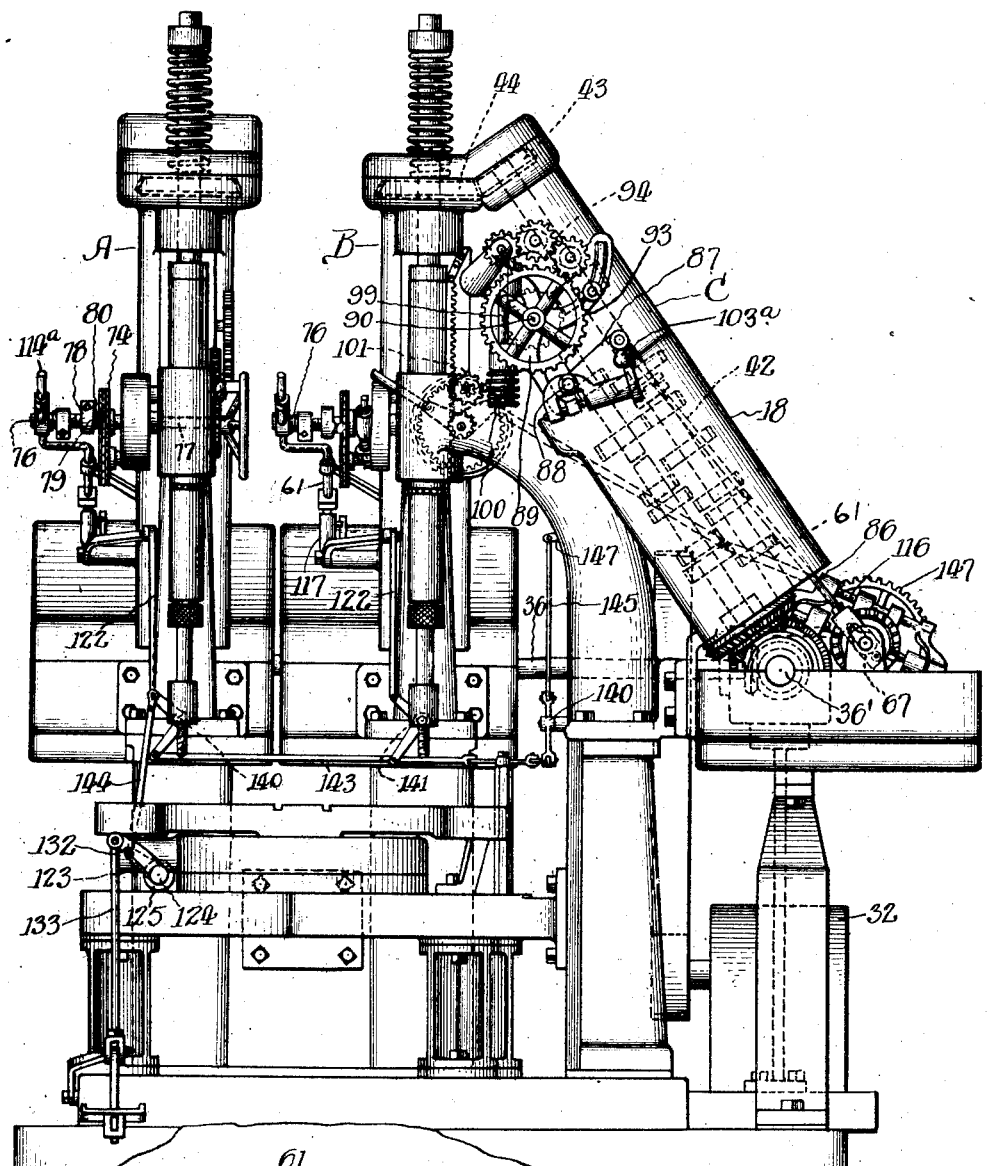

The machine selected for purposes of illustration comprises a base 10 substantially rectangular in form upon which are mounted three independent units A, B and C adapted to perform respectively drilling, reaming and tapping operations. Each of these units comprises a framework consisting of a pair of upright supporting standards 11 and 12, an upwardly and forwardly extending arm 13 and a housing 16 for enclosing the major portion of the driving and control mechanism. The upper end of the arm 13 terminates in a tubular head 17 and above the arm and leading upwardly from the housing 16 in inclined relation thereto is a hollow frame member 18 enclosing the speed change transmission and terminating at its upper end in a housing 19 providing a bearing 20 vertically disposed above the tubular head 17. Mounted in said bearings 17 and 20 for up and down movements in the usual way is the tool spindle 21. Thus the spindle proper designated 22 is equipped with a sleeve 23 held against lengthwise movement thereon and slidable in the bearing head 17, the spindle itself being slidable through the upper bearing 20. The sleeve 23 has rigid therewith the usual rack 24 forming part of the feed mechanism which will presently be described.

In the present instance the units A and B are arranged in parallel relation at one corner of the base 10, and the unit C is arranged substantially perpendicular to the units A and B at the opposite corner of the base; and the arrangement is such that the spindles of the several units are equidistantly spaced apart in the arc of a circle defined by the work mounted for rotation above the base and within the area bounded by the several units.

The work support as herein shown comprises a table 25 mounted to turn on a vertical stud 26 which latter is carried in a horizontal circular plate 27 rigid with a suitable support 28. The latter is mounted above and in spaced relation to the base 10 by means of a plurality of standards 29 and may be secured directly to the inner standards 11 of the respective units. The table 25 (Fig. 4) has rigid with its underside an annular member or ring 30 at the center of which is a hub 31 providing a bearing for the table on the stud 26. The table is thus spaced vertically from and slides upon the horizontal plate 27. The table has in the present instance four radially extending arms 31 each of which provides at its free end a work supporting station, these stations being equidistantly spaced apart in the arc of the circle containing the axes of the spindles 21 of the several units.

The several units A, B and C are arranged to be driven from a common source of power consisting herein of an electric motor 32 mounted on the base near the rear portion thereof and having a pulley wheel 33 connected by a belt 34 to a pulley wheel 35 fast on a drive shaft 36 journalled in and extending transversely of the housings 16 of the units A and B. The shaft extends beyond the housing of the unit B to a point above the rear corner of the base where it enters a gear box 37 mounted on a suitable standard 38 rising from the base. Extending from the gear box 37 in a direction perpendicular to the shaft 36 is a drive shaft 36′ which enters and is journalled in the housing 16 of the unit C. Suitable miter gears 39 within the gear box 37 connect the shafts 36 36′ together. It will be seen that the shafts 36 and 36′ constitute in effect a single drive means for the several units of the machine, and further it will be noted that by reason of the arrangement of the unit C in perpendicular relation to the two parallel units A and B only two shafts are necessary.

The units A and B being adapted to perform respectively drilling and reaming operations, the spindles are driven in one direction only, while the spindle of the unit C, being adapted to perform a tapping operation, is arranged to be driven in opposite directions. The major portion of the driving and control mechanism employed in the case of the several units A, B and C is however the same.

Rigid with the shafts 36 or 36′ within the housing 16 for each of the units is a miter gear 40 (Fig. 5) meshing with a similar gear 41 which is connected by a suitable change speed power transmission designated generally by the numeral 42 (Fig. 2) enclosed within the inclined hollow frame member 18. Inasmuch as this speed change transmission is old and well known in the art, it is deemed unnecessary to illustrate and describe it in detail. It terminates at its upper end in a bevel gear 43 meshing with a bevel gear 44 splined on the spindle 22.

Extending parallel and in spaced relation to the shafts 36 or 36′ within the housing 16 of each of the units A, B and C is a shaft 45 (Fig. 3ª) and journalled at one end of this shaft is a sleeve 46 with which is rigid a spur gear 47 meshing with a spur pinion 48 (Fig. 3) fast on the drive shaft. The sleeve 46 has rigid therewith a toothed head 49 which is arranged to be connected intermittently with an axially alined shaft 50, in a manner hereinafter set forth. The connection between the head 49 and the shaft 50 consists of a dog 51 pivoted at 52 within a slot 53 in a cylindrical member 54 which in the present instance is formed integral with the shaft 45 and is rigid with the shaft 50. A coiled spring 55 normally acts to hold the dog 51 in engagement with ratchet teeth 56 on the head 49. It will be seen that the dog 51 projects from one side of the cylindrical member 54 and in its rotation with the head 49 it is carried into the path of either one of two cam fingers 57 and 58. These fingers are mounted respectively on diametrically opposite sides of the member 54 on sprocket arms 59 and 60 rigid with a rod 61 which is slidable in suitable bearings 62 formed in a bracket 63. The latter also provides bearings 64 and 65 for the cam fingers 57 and 58. The rod 61 is adapted to be slid in its bearings 62 under the control of the spindle to position either of the fingers 57 and 58 in the path of the dog 51, and the arrangement is such that when the dog engages one of the fingers it becomes disengaged from the toothed head 49, thus interrupting the operation of the feed mechanism.

In the case of the units A and B, means is provided for effecting an initial or rapid approach of the spindles toward the work, and thereupon the feed mechanisms for all of the units are set into operation.

The rapid approach mechanism for the A and B spindles comprises in each instance a cam 66 (Fig. 5) on the shaft 50. This cam 66 is arranged to engage a roller 68 on an arm 69 mounted on a stationary shaft 70 and having rigid therewith a gear segment 71. The segment 71 in turn meshes with a pinion 72 having rigid therewith a sprocket wheel 73 over which runs a chain 74 leading forwardly and running over a sprocket wheel 75 (Fig. 2) mounted to travel upon the threaded end 76 of a cross feed shaft 77. An adjustable stop 78 (Fig. 2$^a$) having a boss 79 is adapted for engagement by a lug 80 on the sprocket 75. The arrangement is such that as the sprocket is rotated in the operation of the cam 66, it moves outwardly a short distance until the lug 80 engages the boss 79. Fast on the shaft 77 is a spur pinion 81 (Fig. 2$^b$) which meshes with the rack 24 on the spindle sleeve 23, and the arrangement is such that after the initial rotation of the sprocket wheel on the feed shaft the spindle is moved downwardly at a relatively high speed until the dwell 82 (Fig. 5) of the cam is reached, when the downward descent of the spindle is continued by the feed mechanism.

The feed mechanisms of the several units are under the control of cams 67 (Figs. 3 and 5) on the shaft 50. Each of these cams 67 is arranged to operate upon a roller 83 mounted in the lower or rear end of a shoe 84 (Fig. 5) which in turn is mounted upon the cam shaft 50 for relative transverse sliding movement as permitted by slots 85 formed at opposite sides of the shoe. Rigid with the shoe and extending upwardly and forwardly therefrom is a rod 86 entered through the lower end of the inclined frame member 18 and emerging from the frame near its upper end at one side thereof (Fig. 1). Said rod is connected at its upper end to a lever 87 pivoted upon a stud 88 projecting outwardly from the side of the frame, and the lever 87 in turn is operatively connected to a bracket 89 pivoted upon a shaft 90.

The feed mechanism comprises a spur gear 93 mounted on the shaft 90 and arranged to be driven from a connection with the change feed power transmission enclosed within the frame 18, and this spur gear 93 is connected by suitable gearing 94 with a vertical shaft 99 journalled in the bracket 89 and having a worm 100 at its lower end. The worm 100 is adapted to move with the bracket 89 into and out of engagement with the worm wheel 101 fast on a shaft 102 (Fig. 2$^a$). Normally the worm 100 is held out of mesh with the worm wheel 101 by a coiled expansion spring 103$^a$ (Fig. 1) encircling the upper forward end of the rod 86 and bearing between the frame 18 and the pivot stud by means of which the rod is connected to the lever 87.

The shaft 102 upon which the worm wheel 101 is mounted is operatively connected with the cross feed shaft 77 (Fig. 2$^a$) through a reduction gearing comprising a pinion 107 fast on the shaft 102 and meshing with an internal gear 108 formed within a housing member 109 arranged to rotate with the shaft 77.

By this arrangement, it will be seen the spindles of the several units are moved at a slow or working feed under the control of their respective cams 67. While the cams 66 of the A and B units are operating to effect the rapid approach of the spindles toward the work, the cams 67 are moving so as to set the feed mechanisms in operation to effect the downward travel of all of the spindles at slow or working speeds.

The upward movement of each spindle is effected by means of a coiled compression spring 110 encircling the upper end of the spindle and bearing between a nut 111 and the crown gear 44 in the housing 19. This occurs after the cams 67 move out of engagement with their roller 83, permitting the springs 103$^a$ to disengage the worms 100 from the worm wheels 101. However, the final operation of each of the cams 67 to disengage their respective feed mechanisms is under the control of the spindle in its downward movement, and on the other hand the operation of the means to start the spindle on its downward movement is under the control of the table in the indexing operation. The means for controlling this operation of the spindles will now be described.

As shown in Fig. 2$^a$, each cross feed shaft 77 carries in addition to the stop 78 a stop 112 arranged to be clamped in any desired position of adjustment on the shaft. A nut 114 on the shaft is operatively connected through an arm 115 (Fig. 2) with the rod 61 which operates the stop pins 57 and 58. The rod 61 is in the form of a plurality of sections pivoted at 116. This nut has a hand lever 114$^a$ so that it may when desired be operated by hand. The nut and stop have bosses 113, and the arrangement is such that as the spindle approaches its predetermined lowermost position such bosses interengage with the result that the nut is rotated in a direction to move the rod 61 upwardly and forwardly to disengage the stop pin 57 from the dog 51, thus releasing the dog for engagement with the teeth of the head 49. In the ensuing rotation of the cam shaft 50, through a half revolution, the cam 67 moves free of the roller 83 allowing the spring 103$^a$ to effect the disengagement of the worm 100 from the worm wheel 101. The result is that the spindle travels to its uppermost position and in the rotation of the feed shaft 77 the nut 114 moves away from the stop 112.

When the last spindle has been returned to its uppermost position, the work table 25 is ready to be indexed to move the work from beneath one spindle and move it to the next position. The construction and arrangement which I have provided is such that as the table is indexed to its new position the control mechanisms are operated automatically to start the spindles on their downward strokes.

For thus operating the control mechanisms of the several units, I provide in each instance a bell-crank lever 117 (Fig. 2) pivoted at 118 on the frame and having in one arm a spring-pressed dog 119 (Fig. 1$^a$) adapted to engage with a block 120 adjustably mounted on the rod 61. The other arm 121 of each bell-crank 117 is connected by a link 122 with a second bell-crank 140 mounted on the frame, and the several bell-cranks 140 are connected together by linkage 143.

The bell-crank 140 of the A unit is connected by a link 144 with an arm 123 on a rock shaft 124 (Figs. 1 and 2) mounted at one side of the table. This rock shaft extends through a bearing 125 formed at one side of the table support 27 and enclosing a pinion 126 (Fig. 4) meshing with a rack 127 on a plunger 128. The latter is slidable radially of the table in a housing 129 and its inner end is adapted to engage in indexing holes 130 in the periphery of the table. A coiled expansion spring 131 is interposed between the plunger 128 and its housing.

The end of the rock shaft 124 passing through the bearing 125 carries a lever arm 132 connected by a link 133 with a treadle 134 pivoted at 135 on the base. A contractile spring 136 normally holds the treadle in its uppermost position and coacts with the spring 131 to hold the plunger 128 in operative engagement with the table.

When the spindles are in their uppermost position, it will be remembered, their rods 61 have been moved forwardly so that the dog blocks 120 are in their foremost positions; and when the treadle 134 is depressed to disengage the plunger 128 from the table, the bell-crank levers 117 are swung to carry the dogs 119 forwardly of the dog blocks 120 (Fig. 2). On the other hand, when the treadle is released the dogs engage with their respective blocks during a predetermined portion of their arc of movement and then move out of engagement with the blocks so as to permit the latter to move forwardly in the automatic tripping of the spindle feeds. For guiding each of the dogs 119 in its movements, I provide on the side of each frame member 18 a cam 137 (Figs. 1$^a$ and 2) and on each dog 119 projecting through a slot 138 in the bell-crank, is a pin 139 adapted to engage the cam 137. The cam is so shaped that in the depression of the treadle and hence the forward movement of the dog the latter moves under the dog block and outwardly in front of it. When the treadle is released (the table having in the meantime been indexed) to lock the table against movement, the dog is swung under the action of the springs 136 and 131 into engagement with its block to move the rod 61 downwardly and rearwardly a sufficient distance to disengage the finger 58 from the driving dog 51 of the control mechanism. In the latter part of this rearward movement, the pin 139 engages with the cam 137 so as to withdraw the dog 119 from in front of its block as shown in broken lines in Fig. 1$^a$.

Upon the release of the driving dog 51, as set forth it is forced by its spring 55 into engagement with the teeth 56 of the head 49, and drives the shaft 50 through a half revolution, or until the dog 51 is disengaged from the head 49 by reason of its cam engagement with the finger or pin 57. In such movement of the shaft 50, the cams 66 of the A and B units move into engagement with the roller 85 on the lever arm 69, and thus effect the rapid downward descent of these spindles until the dwell portions 82 of the cams are reached.

As above set forth, at this point in the operation of the several units each of the cams 67 operates to throw in the feed by engaging the worms 100 with the worm wheels 101, whereupon the spindles are fed downwardly at working speed. As the spindles approach their lowermost positions, the rods 61 are moved forwardly by the stop 112 engaging with the nut 114, the dogs 119 being withdrawn into inoperative positions by the cams 137.

In the case of the B unit, of which the upper end of the spindle is shown in Fig. 2, and which in the present instance is adapted to perform a reaming operation I provide in operative association with the feed mechanism means (Fig. 2$^b$) effecting a dwell of the spindle at the end of its downward stroke. This is accomplished in the present instance by mounting the internal gear housing 109 loosely on the feed shaft 76, and providing adjacent said housing but rigid with the shaft a member 149. This member 149 is constructed to provide oppositely disposed bracket arms 150 and the housing 109 similarly has oppositely disposed tubular heads 151 each containing an expansion spring 152 acting upon a ball 153 to force it onto a seat provided by the bracket arm. A limited relative rotary movement between the two parts 109 and 149 is permitted by slots 154 in the housing 109 into which bolts 155 on the member 149 enter. The arrangement is such that the springs 152 are of substantial strength so as to hold the bracket arms spaced from the heads 151 with the bolts 155 at one end of their respective slots; and during the initial portion of the reaming operation this relation is maintained. However, at a predetermined point in the downward travel of the spindle, its movement is positively stopped as by means of a sleeve 156 on the upper end of the spindle engaging, at its lower end, the crown gear 44 and adapted to be engaged at its upper end by the stop collar 111 fast on the spindle. When the downward movement of the spindle is thus positively stopped the feed mechanism may continue to operate as permitted by the yielding of the springs 152 so as to continue to hold the reaming tool to the work but without imparting to the spindle a feeding movement. This insures that at the cessation of the reaming operation the surface shall be left free from burrs such as are necessarily incident to the continued feeding operation. The arrangement is, of course, such that as the limited amount of relative movement between the two sections is approximately taken up the feed mechanism will be tripped by the engagement of the nut 114 with the stop 112 on the cross feed shaft 77 as above described.

In the case of the unit C, which in the embodiment illustrated is a tapping unit, the spindle is rotated in one direction as it moves downwardly into engagement with the work and then as the feed is interrupted, the direction of rotation is reversed until the tap becomes disengaged from the work whereupon the spindle returns to its uppermost position under the action of its spring 110. Referring to Figs. 3 and 7, I provide in this instance, in addition to the driving miter gear 40 another miter gear 40', both gears being loose on the shaft extension 36' and adapted to be connected thereto by means of a clutch 158. The means for operating the clutch comprises a lever 159 operatively associated with the clutch member 158 and having a roller 160 engaging with controlling cams 161 fast on the shaft 50. The arrangement is such that upon the operation of the feed trip mechanism at the end of the downward stroke of the spindle, the cam 161 operates to swing the lever 159 so as to operate the clutch member 158 into driving engagement with the miter gear 40' and thus reversely rotate the spindle; and when the control mechanism is operated by the treadle as above described to start the spindle on its downward movement, the clutch member is operated into driving engagement with the miter gear 40 so as to rotate the spindle in a direction to perform the tapping operation. It will be observed that during the reverse operation of the spindle the feed mechanism is disengaged so that as soon as the tap has become disengaged from the work, the spindle is rapidly moved upwardly by its spring 110.

The operation: Assuming that the operations to be performed are drilling, reaming and tapping operations, and that the spindles are in their initial or uppermost positions with the work table to be indexed; the operator depresses the treadle 134 of the common control means so that each of the dogs 119 are swung forwardly, being guided in this movement by the cams 137 into positions in front of the dog blocks 120 on the rods 61. At the same time, the plunger 128 is withdrawn from the table and the operator manually rotates the table to its new position. The treadle being thereupon released the plunger 128 moves inwardly to lock the table against movement, while the dogs 119 of the bell-crank levers 117, 146 and 147, engaging with the dog blocks 120 on the respective rods 61, move the rods 61 downwardly and rearwardly and thus disengage the fingers 58 of the several main control mechanisms from their respective dogs 51. The dogs 51 are thus forced by their springs 55 into engagement with the constantly rotating heads 49, and they move through a half revolution, until disengaged by the fingers 57, the latter having been moved into the paths of the dogs upon the previous operation of the rods 61. In the case of the units A and B, the cams 66 now operate to move the spindles downwardly at high speed, and as the dwell 82 of these cams comes into action the cams 67 operate to cause the worms 100 of the two feed mechanisms to engage with their respective worm wheels 101 so as to feed the spindles downwardly by power derived from the power transmissions 42 driven in each instance by a miter gear 40. At the same time, the feed mechanism of the unit C is set in operation. The drilling operation requires the longest period of time so that while this operation is being performed the spindle of unit B is fed into engagement with the work, dwelled, and released to the action of its spring 110; and the spindle of the unit C is fed into engagement with the work, tripped and reversed so as to become disengaged from the work and released to the action of its spring 110. Finally the feed mechanism for the spindle of the unit A is tripped and the spindle released to the action of its spring for movement to its initial or upper position. The several operations having now been completed, the treadle is depressed to release the table, the table is indexed and as the treadle is released the several control mechanisms are operated to again start the spindles downward for another cycle of operations.

It will be observed that all of the operations are performed in the time required for the slowest operation, herein the drilling operation, and since the loading of the new piece of work upon the table is accomplished while the machine is in operation, the machine accomplishes the three operations in the time which would normally be consumed for one operation, viz, the drilling operation. Moreover, all of the tool spindles are in full view of the operator stationed at the front of the machine and in the event that it becomes necessary or desirable to stop one of the spindles, this may be readily accomplished without disturbing the operation of the other spindles.

While I have herein shown and described the several units A, B and C as performing, respectively, drilling, reaming and tapping operations in sequence, it will be understood that the invention is not limited to such operations nor to the particular sequence set forth. Also it will be understood that while I have herein disclosed a manually operable indexing mechanism, the work supporting table may be operated by power derived from another source if desired such, for example, as power driven indexing mechanisms of usual and well known construction.

I claim as my invention:

1. A gang tool comprising, in combination, a rotary work support having a plurality of stations arranged in equidistantly spaced relation in the arc of a circle, a plurality of units having spindles also arranged in equidistantly spaced relation corresponding to the relation of said stations on the work support, each of said units having a feed mechanism and a control mechanism including a control element for the feed mechanism, an indexing mechanism for said work support including a locking means, and means operatively connecting the several control elements to said locking means and adapted in the operation of locking the table to control the feed mechanisms of the several units.

2. A gang tool comprising, in combination, a rotary work support having a plurality of stations arranged about said support in equidistantly spaced relation and including a loading station, a plurality of units each including a spindle with feed mechanism therefor and a control mechanism for the feed mechanism, the control mechanisms for the several units each including a control element operable to interrupt the operation of the respective feed mechanisms at predetermined points in such operation, an indexing mechanism for the table including a locking device, and means operatively connecting said locking device with the control elements of the several units and adapted in the operation of locking the table to start the several feeding mechanisms in operation simultaneously so as to cause the respective spindles to move into engagement with the work.

3. A gang tool comprising a base, a rotary work support mounted on the base, a pair of units mounted on the base at one side of said work support and having upright frames arranged in parallel relation, a third unit mounted on the base on another side of the work support and having an upright frame disposed substantially perpendicular to the other two frames, the several units having spindles arranged in equidistantly spaced relation above the work support, and feed and control mechanism for the spindles of each of said units.

4. A gang tool comprising a base, a rotary work support mounted on the base, a pair of units mounted on the base at one side of said work support and having upright frames arranged in parallel relation, a third unit mounted on the base on an adjacent side of the table and having an upright frame disposed substantially perpendicular to the other two frames, the several units having spindles arranged in equidistantly spaced relation above the work support, drive means including a shaft for said pair of units and a shaft for the third unit, feed mechanisms for the respective units arranged to be driven from said shafts, and control mechanisms for each of the units operatively associated with said shafts and with said feed mechanisms.

5. A gang tool comprising a base, a rotary work support mounted on the base, a pair of units mounted on the base at one side of said work support and having upright frames arranged in parallel relation, a third unit mounted on the base on an adjacent side of the table and having an upright frame disposed substantially perpendicular to the other two frames, the several units having spindles arranged in equidistantly spaced relation above the work support, drive means, feed mechanisms for the respective units connected with said drive means, control mechanisms for each of the units operatively associated with said drive means and with said feed mechanisms, and means common to the several units for actuating said control mechanisms.

6. A gang tool comprising a base, a rotary work support mounted on the base, a pair of units mounted on the base at one side of said work support and having upright frames arranged in parallel relation, a third unit mounted on the base on an adjacent side of the table and having an upright frame disposed substantially perpendicular to the other two frames, the several units having spindles arranged in equidistantly spaced relation above the work support, drive means common to the several units, feed mechanisms for the respective units arranged to be driven from said drive means, control mechanisms for each of the units operatively associated with said drive means and with said feed mechanisms, said work support having an indexing mechanism, and means common to the several units and operating under the control of said work support to actuate said control mechanisms.

7. A gang tool comprising a work table, a plurality of units arranged about said table and each having a spindle overhanging the table, each of said units including feed and control mechanisms, drive means common to the several units with which each of said control and feed mechanisms is operatively associated, and means common to the several control mechanisms for actuating the same.

8. A gang tool comprising a plurality of units each having a spindle with feed and control mechanisms therefor, and a common drive means for the several controlling mechanisms, each of said control mechanisms including a constantly driven member, an intermittently driven member, and means controlled by the spindle for effecting a connection between said members, said means automatically operating after a predetermined rotation of the driven member to interrupt its connection with the driving member.

9. A gang tool comprising a plurality of units each having a spindle with feed and control mechanisms therefor, and a common drive means for the several controlling mechanisms, each of said control mechanisms including a constantly operating drive member, an intermittently driven member, and means controlled by the spindle for effecting a connection between said members, said means operating automatically after a predetermined rotation of the driven member to interrupt its connection with the driving member, said driven member having cam means operatively associated therewith for controlling the movements of the spindle.

10. A gang tool comprising a plurality of units each having a spindle with feed and control mechanisms therefor, and a common drive means for the several controlling mechanisms, each of said control mechanisms including a constantly operating drive member, an intermittently driven member, and means controlled by the spindle for effecting a connection between said members, said means automatically operating after a predetermined rotation of the driven member to interrupt its connection with the driving member, said driven member having a cam operatively associated therewith for controlling the operation of the feed mechanism.

11. In a machine tool, the combination of a spindle having feed and control mechanisms, said control mechanism including means operating automatically as the spindle approaches a predetermined point in its feeding movement to interrupt such movement, and manually operable means for actuating said control mechanism to start the spindle toward the work including a treadle, a lever operated by said treadle, and an actuating dog, said control mechanism including an operating rod having a member adapted to be engaged by said dog.

12. A gang tool comprising a plurality of units each having a spindle with feed and control mechanisms therefor, said control mechanisms each including a longitudinally movable member moving in one direction in the operation of the control mechanism to start the spindle toward the work and in the opposite direction in the operation of the control mechanism to effect the return of the spindle to its initial position, said control mechanism being automatically operable to move said member in one direction, and manually operable means to move the member in the opposite direction.

13. A gang tool comprising a plurality of units each having a spindle with feed and control mechanisms therefor, said control mechanisms each including a longitudinally movable member moving in one direction in the operation of the control mechanism to start the spindle toward the work and in the opposite direction in the operation of the control mechanism to effect the return of the spindle to its initial position, said control mechanism being automatically operable to move said member in one direction, and manually operable means to move the member in the opposite direction, the last mentioned means including an actuating dog and cam means operating to move said dog to hold it normally out of the path of movement of said member.

14. A gang tool comprising a rotary work support, indexing mechanism therefor, a plurality of units each having a spindle with feed and control mechanisms, said control mechanisms being operable to interrupt the feeding movements of the spindles toward the work, and manually operable means operatively associated with said indexing mechanism whereby to actuate said control mechanisms to start the spindles toward the work.

15. A gang tool comprising a rotary work support, indexing mechanism therefor, a plurality of units each having a spindle with feed and control mechanisms, said control mechanisms being operable to interrupt the feeding movements of the spindles toward the work, and manually operable means operatively associated with said indexing mechanism whereby to actuate said control mechanisms to start the spindles toward the work, said manually operable means including a member movable in the operation of the control mechanism, and a device adapted to engage with said member to move it and operable in such movement to move out of the path of movement of said member.

16. A machine tool comprising, in combination, a reciprocatory spindle, feed mechanism for the spindle, a drive shaft, means driven from said shaft for reversely rotating the spindle including a clutch, cam means for operating said clutch, and cam means controlling said feed mechanism, both of said cam means being operatively associated with said drive shaft.

17. A machine tool comprising, in combination, a reciprocatory spindle, feed mechanism for the spindle, and a control mechanism for the feed mechanism including a control element, automatically actuated means operating upon said element to interrupt the feeding movement of the spindle, and other means for operating said element including a reciprocatory member adapted to move said element through a predetermined range of movement and thereupon operating to release said element for movement by said automatic means.

18. In a machine tool, the combination of a spindle having feed and control mechanisms, said control mechanism including a reciprocatory member operating automatically as the spindle approaches a predetermined point in its feeding movement to interrupt such movement, other means for actuating said control mechanism to initiate the feeding movement of the spindle including an actuating dog for said member, and means operating in the movement of said dog to disengage it from said member after a predetermined movement of the member by the dog.

19. A machine tool comprising, in combination, a rotary work support having an indexing mechanism, a reciprocatory spindle, a feed mechanism for said spindle, a mechanism for controlling the reciprocation of the spindle including a control element operable to interrupt the feeding movement of the spindle, and other means operable when the work support is at rest to actuate the control element whereby to start the feeding operation of the spindle.

In testimony whereof, I have hereunto affixed my signature.

ALBERT M. JOHNSON.